(12) United States Patent
Pundak

(10) Patent No.: US 12,449,925 B2
(45) Date of Patent: Oct. 21, 2025

(54) ELECTROSTATIC PERIPHERAL COMMUNICATION FOR TOUCH-SENSITIVE DISPLAY

(71) Applicant: Microsoft Technology Licensing, LLC, Redmond, WA (US)

(72) Inventor: Gilad Pundak, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/716,651

(22) PCT Filed: Nov. 15, 2022

(86) PCT No.: PCT/US2022/079857
§ 371 (c)(1),
(2) Date: Jun. 5, 2024

(87) PCT Pub. No.: WO2023/114591
PCT Pub. Date: Jun. 22, 2023

(65) Prior Publication Data
US 2025/0036230 A1    Jan. 30, 2025

(30) Foreign Application Priority Data
Dec. 13, 2021 (NL) ...................... 2030117

(51) Int. Cl.
G06F 3/041    (2006.01)
G06F 3/01     (2006.01)
G06F 3/0354   (2013.01)

(52) U.S. Cl.
CPC .......... *G06F 3/04162* (2019.05); *G06F 3/016* (2013.01); *G06F 3/03545* (2013.01); *G06F 3/03547* (2013.01); *G06F 3/0412* (2013.01)

(58) Field of Classification Search
CPC .. G06F 3/04162; G06F 3/016; G06F 3/03545; G06F 3/03547; G06F 3/0412
See application file for complete search history.

(56) References Cited

U.S. PATENT DOCUMENTS

| | | | |
|---|---|---|---|
| 9,639,183 B2 | 5/2017 | Fleck et al. |
| 10,649,531 B2 | 5/2020 | Klein et al. |

(Continued)

FOREIGN PATENT DOCUMENTS

| | | |
|---|---|---|
| CN | 103221904 B | 3/2016 |
| EP | 3920011 A1 | 12/2021 |
| EP | 3830677 A1 | 4/2023 |

OTHER PUBLICATIONS

International Search Report and Written Opinion received for PCT Application No. PCT/US22/079857, Feb. 2, 2023, 13 pages.

(Continued)

*Primary Examiner* — Peter D McLoone
(74) *Attorney, Agent, or Firm* — Alleman Hall & Tuttle LLP

(57) ABSTRACT

A touch-sensitive display device comprises: a first touch-sensitive input device comprising touch-sensitive display including a first plurality of touch-sensing electrodes, and a second touch-sensitive input device including a second plurality of touch-sensing electrodes. A peripheral device uplink controller is configured to receive a command to transmit outgoing computer data from the touch-sensitive display device to a separate peripheral device via an electrostatic uplink. The outgoing computer data is transmitted via the first plurality of touch-sensing electrodes of the touch-sensitive display by driving the first plurality of touch-sensing electrodes with an encoded electrostatic drive signal. The outgoing computer data is transmitted via the second plurality of touch-sensing electrodes of the second (Continued)

touch-sensitive input device by driving the second plurality of touch-sensing electrodes with the encoded electrostatic drive signal.

20 Claims, 5 Drawing Sheets

(56) References Cited

U.S. PATENT DOCUMENTS

| | | |
|---|---|---|
| 11,073,945 B1 | 7/2021 | Pundak et al. |
| 2014/0253522 A1 | 9/2014 | Cueto |
| 2016/0370912 A1 | 12/2016 | Qiao et al. |
| 2017/0344171 A1 | 11/2017 | Qiao |
| 2018/0129340 A1* | 5/2018 | Westhues .............. G06F 3/0442 |
| 2020/0068136 A1 | 2/2020 | Lee |
| 2020/0073489 A1 | 3/2020 | Abzarian et al. |
| 2023/0350514 A1* | 11/2023 | Barel .................... G06F 3/0383 |

OTHER PUBLICATIONS

Onawole, Habeeb., "It's Time for More Phone Manufacturers to Adopt the Stylus," retrieve from: https://www.gizmochina.com/2021/02/10/its-time-for-more-phone-manufacturers-to-adopt-the-stylus/, Feb. 10, 2021, 6 pages.

Search Report and Written Opinion Issued in Netherlands Patent Application No. N2030117, Jul. 13, 2022, 9 pages.

* cited by examiner

ELECTROSTATIC PERIPHERAL COMMUNICATION FOR TOUCH-SENSITIVE DISPLAY

CROSS REFERENCE TO RELATED APPLICATIONS

The present application is a U.S. National Phase of International Patent Application Serial No. PCT/US2022/079857 entitled "ELECTROSTATIC PERIPHERAL COMMUNICATION FOR TOUCH-SENSITIVE DISPLAY", filed Nov. 15, 2022, which claims priority to Netherlands Patent Application Serial No. 2030117, filed Dec. 13, 2021, the entire contents of each of which are hereby incorporated by reference for all purposes.

BACKGROUND

Computing devices may be configured to electronically "pair" with one or more peripheral devices—e.g., accessories such as styluses, mice, and keyboards. By pairing with a peripheral device, the computing device may establish a unidirectional or bidirectional communications channel over which the two devices can communicate.

DETAILED DESCRIPTION

Figure 1:
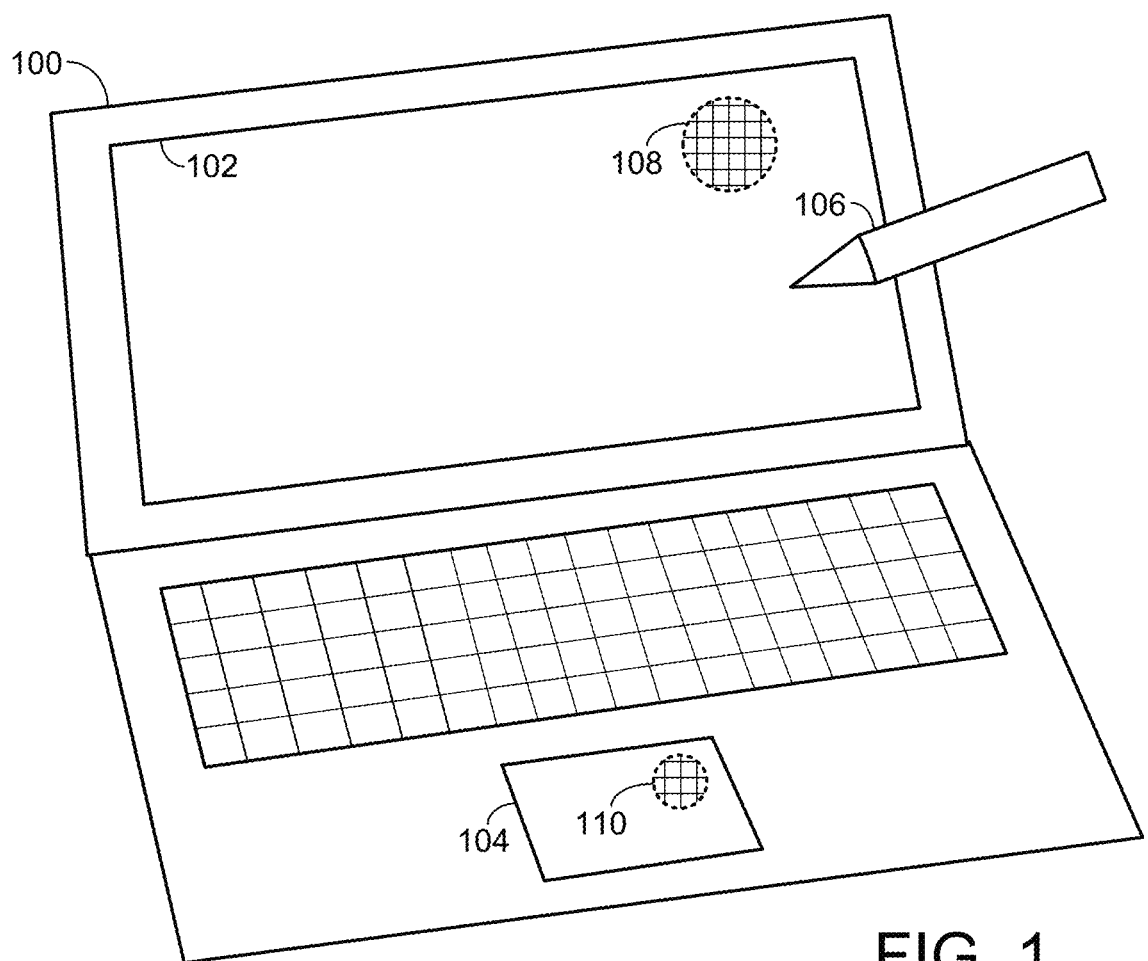
FIG. 1 schematically shows an example touch-sensitive display device and an example peripheral device.

As discussed above, electronic pairing of a computing device with a separate peripheral device may be used to establish a unidirectional or bidirectional channel over which one device may send data to another. For example, a computing device that includes a touch-sensitive display may pair with a peripheral device taking the form of an active stylus. In this manner, the stylus may control operation of the computing device—for example, the stylus may include a physical button that, when actuated, causes the computing device to launch a corresponding application. Similarly, the stylus may provide touch or hover inputs to the touch-sensitive display—e.g., to interact with software interfaces or to draw lines or shapes—while the computing device controls haptic feedback functionality of the stylus. Notably, because the computing device and the stylus are paired, providing an input using the stylus (e.g., by actuating a physical button) will beneficially cause only the paired computing device to respond, and not any other nearby computing devices. This may help to reduce the risk that a user inadvertently uses a peripheral device (e.g., stylus) to control one or more unintended computing devices—e.g., computing devices belonging to other users.

In a common scenario, a user may use the same peripheral device (e.g., stylus) with multiple different host computing devices (e.g., touch-sensitive display devices) at different times. For example, the user may use a stylus with their own computer, a coworker's computer, a shared office computer, etc. In various cases, the user may prefer to use substantially similar settings—e.g., relating to haptic feedback behavior, or a preferred color to be used with touch "ink" inputs—regardless of the host computing device that the user is interacting with. In other cases, the user may prefer to use different settings profiles depending on the current host computing device they are using. In any case, however, it is generally desirable to establish the pairing relationship as quickly as possible—e.g., to reduce the amount of time in which the user's preferred settings are not applied, or to reduce the amount of time in which the user's control inputs cause an unintended device to respond.

In some cases, pairing a computing device with a separate peripheral device may require manual effort on the part of the user—e.g., the user may be required to manually interact with physical or software-based connection settings of the computing device and/or peripheral device to establish a pairing. Even in cases where automatic pairing is possible, there will inherently be some amount of latency associated with pairing a computing device with a separate peripheral device, and such latency can be distracting or disruptive. In one example scenario, a user may use a peripheral device (e.g., an active stylus) to control a first computing device (e.g., a first laptop), then move the peripheral device to a second computing device (e.g., a second laptop belonging to a different user), intending to use their stylus to control the second laptop. While the second laptop may automatically pair with the user's stylus, there may still be a noticeable latency period during which the stylus and second laptop are not paired, and thus the stylus for a time may not provide the correct haptic feedback, or not cause use of a desired inking color, as examples.

This latency can in some cases be related to the angle or position of the stylus (or other peripheral device) relative to the computing device (e.g., touch-sensitive display device) that it is pairing with. For example, pairing between a touch-sensitive display device and active stylus may in some cases be facilitated through electrostatic transmission of encoded computer data via excitation of a plurality of touch-sensing electrodes. However, the reception of this electrostatic transmission at the active stylus may be dependent on the current distance and/or orientation of the stylus relative to the touch-sensing electrodes of the touch-sensitive display device. If, for instance, a user moves their stylus toward a coworker's laptop intending to interact with the laptop, the pairing latency between the laptop and stylus may be noticeably longer depending on the specific way in which the user is holding the stylus relative to the laptop's display, which influences how quickly the stylus detects an electrostatic signal transmitted by the laptop's touch-sensing electrodes.

Accordingly, the present disclosure is directed to techniques for electrostatic communication between a touch-sensitive display device and peripheral device, in which outgoing computer data is transmitted electrostatically via two different sets of touch-sensing electrodes, corresponding to different touch-sensitive input devices of a larger computing device. For example, a touch-sensitive display device (e.g., laptop, tablet computer) may include a first touch-sensitive input device comprising a touch-sensitive display equipped with a first plurality of touch-sensing electrodes, and a second touch-sensitive input device (e.g., touch pad, fingerprint reader) equipped with a second plurality of touch-sensing electrodes, each of which are configured to detect and respond to proximity of input objects (e.g., human fingers, styluses). When both sets of touch-sensing electrodes are driven electrostatically to transmit outgoing computer data, the spatial area in which a separate peripheral device (such as a stylus) can detect the outgoing computer data may be expanded, and the overall strength of the electrostatic signal may be increased.

Furthermore, the techniques described herein may enable the touch-sensitive display device to electrostatically receive incoming data from a separate peripheral device at either or both of the first and second touch-sensitive input devices. For example, a laptop computer may detect presence of an active stylus based on electrostatic conditions detected at the laptop's touch pad, and apply settings corresponding to the detected stylus before the stylus is used to provide touch or hover input at the laptop's touch-sensitive display. The techniques described herein may therefore enable faster pairing and generally more efficient data exchange between the touch-sensitive display device and the separate peripheral device.

FIG. 1 schematically shows an example touch-sensitive device 100, including a first touch-sensitive input device taking the form of a touch-sensitive display 102. Both the touch-sensitive display 102 and touch-sensitive display device 100 may have any suitable sizes and dimensions. In some examples, a touch-sensitive display device may include more than one distinct touch-sensitive display. For example, a touch-sensitive display device as described herein may refer to a device having two or more touch-sensitive displays in a foldable or static configuration, as well as single-display devices such as display device 100. Additionally, or alternatively, the techniques described herein may be applied to computing devices that lack touch-sensitive displays, but rather include or interface with two or more touch-sensitive input devices that do not display visual content.

In general, the techniques described herein may be implemented by any suitable device, having any suitable form factor and including any suitable combination of computer hardware. As non-limiting examples, the techniques described herein may be implemented by desktop computers, laptops, smartphones, tablets, mixed reality devices, fitness devices (e.g., smartwatches), media center devices, automotive computing devices, etc. In some cases, the techniques described herein may be implemented by computing system 500 described below with respect to FIG. 5.

In FIG. 1, touch-sensitive display device 100 also includes a second touch-sensitive input device 104. In some examples, touch-sensitive input device 104 may be another touch-sensitive display. In other examples, however, touch-sensitive input device 104 may lack display pixels and/or other image forming components. For example, touch-sensitive input device 104 may be implemented as a "touch pad," although may generally be implemented as any suitable device or mechanism that uses a plurality of touch-sensing electrodes to electrostatically detect presence of nearby input objects—e.g., human fingers or styluses. In general, a touch-sensitive display device may have any suitable number and variety of different touch-sensitive input regions, any or all of which may be touch-sensitive displays.

It will be understood that the devices and components depicted in FIG. 1 are simplified and schematic in nature. In practical examples, touch-sensitive display devices and separate peripheral devices may include additional or alternative components to those described herein, may have any suitable shapes, sizes, and form factors, and may have any suitable capabilities.

In the example of FIG. 1, a human user (not shown) is using an active stylus 106 to control touch-sensitive display device 100. Active stylus 106 may provide input to the touch-sensitive display device in various suitable ways—e.g., by directly contacting a surface of touch-sensitive display 102, by hovering proximate to the surface of the touch-sensitive display, by touching and/or hovering near touch-sensitive input device 104, by transmitting data reported by a mechanism on the stylus (e.g., a button, switch, pressure sensor, touch-sensitive input region), etc.

Active stylus 106 is one example of a "separate peripheral device" that may exchange data with a touch-sensitive display device, as discussed herein. It will be understood, however, that active stylus 106 is a non-limiting example, and that a peripheral device as described herein need not take the form of a stylus. Rather, peripheral devices may include, as non-limiting examples: styluses, computer mice, keyboards, media playback devices (e.g., speakers, headphones), media capture devices (e.g., cameras, microphones), control devices (e.g., remote controls, video game controllers, control dials), sensors, and IoT (Internet of Things) devices. It will be understood that a touch-sensitive display device may be used with any number and variety of different peripheral devices, each of which may be configured to control or interact with the touch-sensitive display device in any number of different suitable ways.

Touch-sensitive display 102 includes a first plurality of touch-sensing electrodes 108. Similarly, touch-sensitive input device 104 includes a second plurality of touch-sensing electrodes 110. Each of these separate pluralities of touch-sensing electrodes may be configured to detect proximity of nearby input objects. Input objects may include, as examples, human fingers, passive styluses, active styluses, and other suitable electronic devices or non-electronic objects. For example, the touch-sensing electrodes may detect a change in capacitance caused by proximity of an input object to the plurality of electrodes. By monitoring electrical conditions at the plurality of touch-sensing electrodes, the touch-sensitive display device may determine the two-dimensional position of the touch input relative to the surface of the display or the surface of the different touch-sensitive input device. Each of touch-sensing electrodes 108 and touch-sensing electrodes 110 are represented by circles with dashed borders to indicate that the electrodes would not ordinarily be visible from the illustrated perspective.

Figure 2:
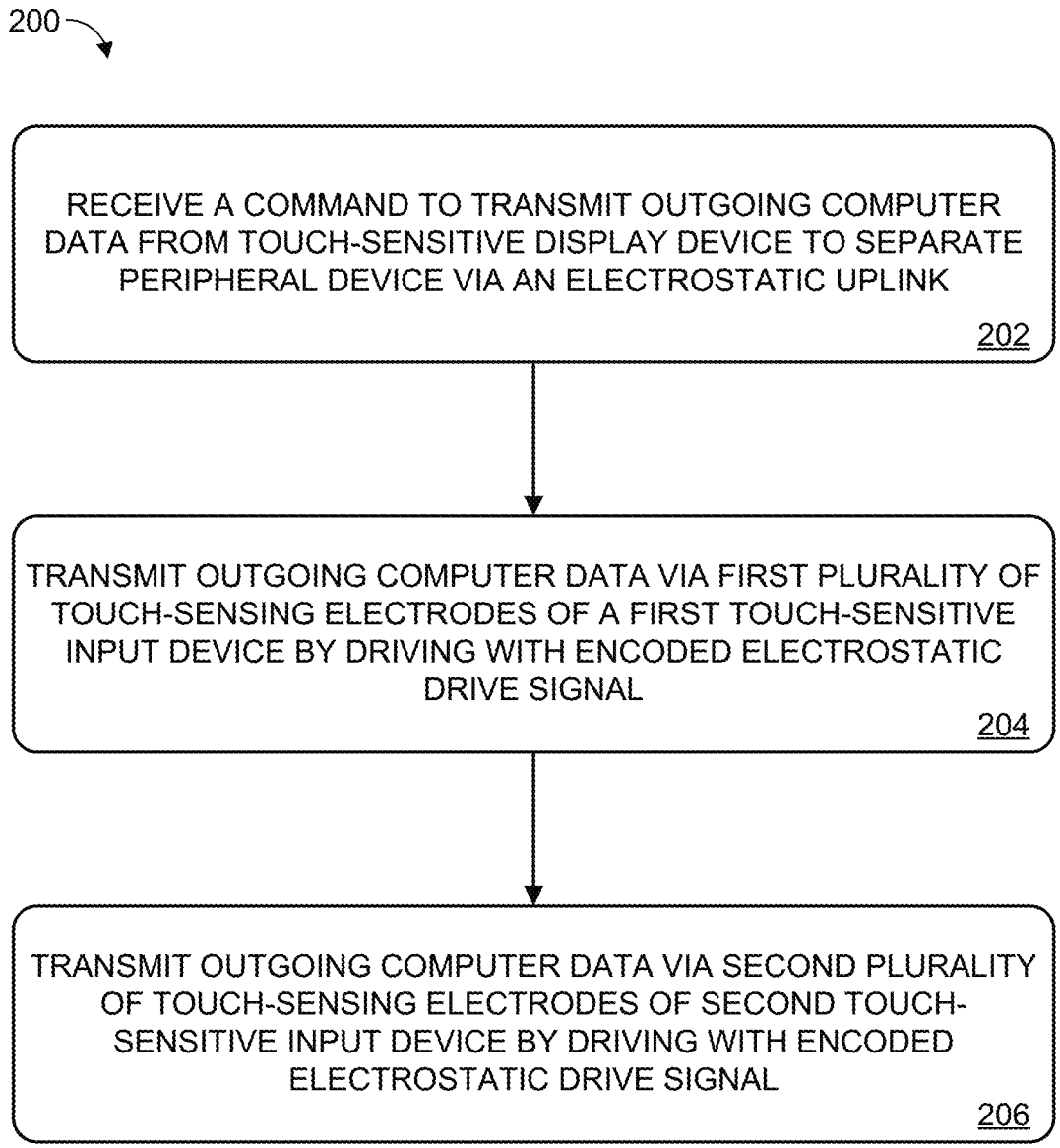
FIG. 2 illustrates an example method for electrostatic communication with a peripheral device.

Furthermore, as discussed above, each set of touch-sensing electrodes may be used to facilitate quicker and more efficient data communication (e.g., relating to device pairing) between a touch-sensitive display device and a separate peripheral device. FIG. 2 illustrates an example method 200 for electrostatic communication between a touch-sensitive display device (e.g., device 100) and a separate peripheral device (e.g., active stylus 106). Method 200 may be implemented by any suitable computing system of one or more computing devices. Any computing device(s) that implements method 200 may have any suitable capabilities, hardware configuration, and form factor. In some cases, method 200 may be implemented by computing system 500 described below with respect to FIG. 5.

More particularly, method 200 is generally described as being performed by a peripheral device uplink controller of a touch-sensitive display device. The peripheral device uplink controller is generally configured to coordinate and control electrostatic exchange of data between the touch-sensitive display device and one or more separate peripheral devices. As used herein, an "uplink" signal refers to transmission of data from a computing device (e.g., a touch-sensitive display device) to a separate peripheral device (e.g., an active stylus). A peripheral device uplink controller may be implemented as any suitable combination of one or more computer processors, integrated circuits, and/or other computer logic components. In some examples, a peripheral device uplink controller may be implemented as logic subsystem 502 described below with respect to FIG. 5.

At 202, method 200 includes receiving a command to transmit outgoing computer data from a touch-sensitive display device to a separate peripheral device via an electrostatic uplink. Use of an electrostatic uplink as discussed herein may beneficially enable faster pairing and exchange of data between the touch-sensitive display device and separate peripheral device as compared to radio-frequency (RF) wireless communication, although suitable RF wireless communication techniques may in some cases be used in addition to electrostatic uplink. As one non-limiting example, the outgoing computer data transmitted to the separate peripheral device may specify an identifier of the touch-sensitive display device—e.g., a media access control (MAC) address of the touch-sensitive display device. This may, for instance, facilitate initial pairing between the touch-sensitive display device and separate peripheral device. As another non-limiting example, the outgoing data transmitted to the separate peripheral device may specify haptic information useable for controlling haptic behavior of the separate peripheral device. For instance, the separate peripheral device may take the form of an active stylus that provides haptic feedback to a user holding the stylus as the stylus is used to provide input to the touch-sensitive display device. This may, for example, simulate the tactile of writing on physical paper using a pencil, when the user is actually writing on a computer display using a stylus. To this end, the touch-sensitive display device may control any or all haptic functions of the separate peripheral device—e.g., specifying a haptic frequency and/or intensity depending on a current context of the touch-sensitive display device.

In general, however, it will be understood that the outgoing computer data transmitted to the separate peripheral device may include any suitable information and take any suitable form, depending on the implementation. The techniques described herein may beneficially be used regardless of the specific type of computer data exchanged between the touch-sensitive display device and the one or more separate peripheral devices. Furthermore, the peripheral device uplink controller may receive a command to transmit the outgoing computer data at any suitable time and for any suitable reason. For example, the peripheral device uplink controller may transmit outgoing computer data when the touch-sensitive display device powers on, wakes from a sleep state, launches an application that interfaces with a peripheral device, detects proximity of a peripheral device in any suitable way, receives a request from a user to initiate pairing with a peripheral device, etc. Additionally, or alternatively, the touch-sensitive display device may repeatedly transmit outgoing computer data at fixed or variable intervals—e.g., after the touch-sensitive display device and separate peripheral device have been paired, the touch-sensitive display device may repeatedly transmit dynamically updating data to the peripheral device. Any suitable fixed or variable time intervals may be used—e.g., outgoing computer data may be transmitted with a frequency of 10 Hz, 30 Hz, 60 Hz, etc.

Continuing with method 200, at 204, the method includes transmitting the outgoing computer data via the first plurality of touch-sensing electrodes of the touch-sensitive display, by driving the first plurality of touch-sensing electrodes with an encoded electrostatic drive signal. In other words, the drive signal applied to the touch-sensing electrodes may include pulses and/or waveforms that express the information to be communicated from the touch-sensitive display device to the separate peripheral device. At 206, method 200 includes transmitting the outgoing computer data via the second plurality of touch-sensing electrodes of the second touch-sensitive input device, by driving the second plurality of touch-sensing electrodes with the encoded electrostatic drive signal. Notably, this may be substantially the same encoded electrostatic drive signal, beneficially allowing both the first and second touch-sensitive input devices to transmit the same information to the separate peripheral device, potentially increasing the range at which the signal is detectable.

Figure 3:
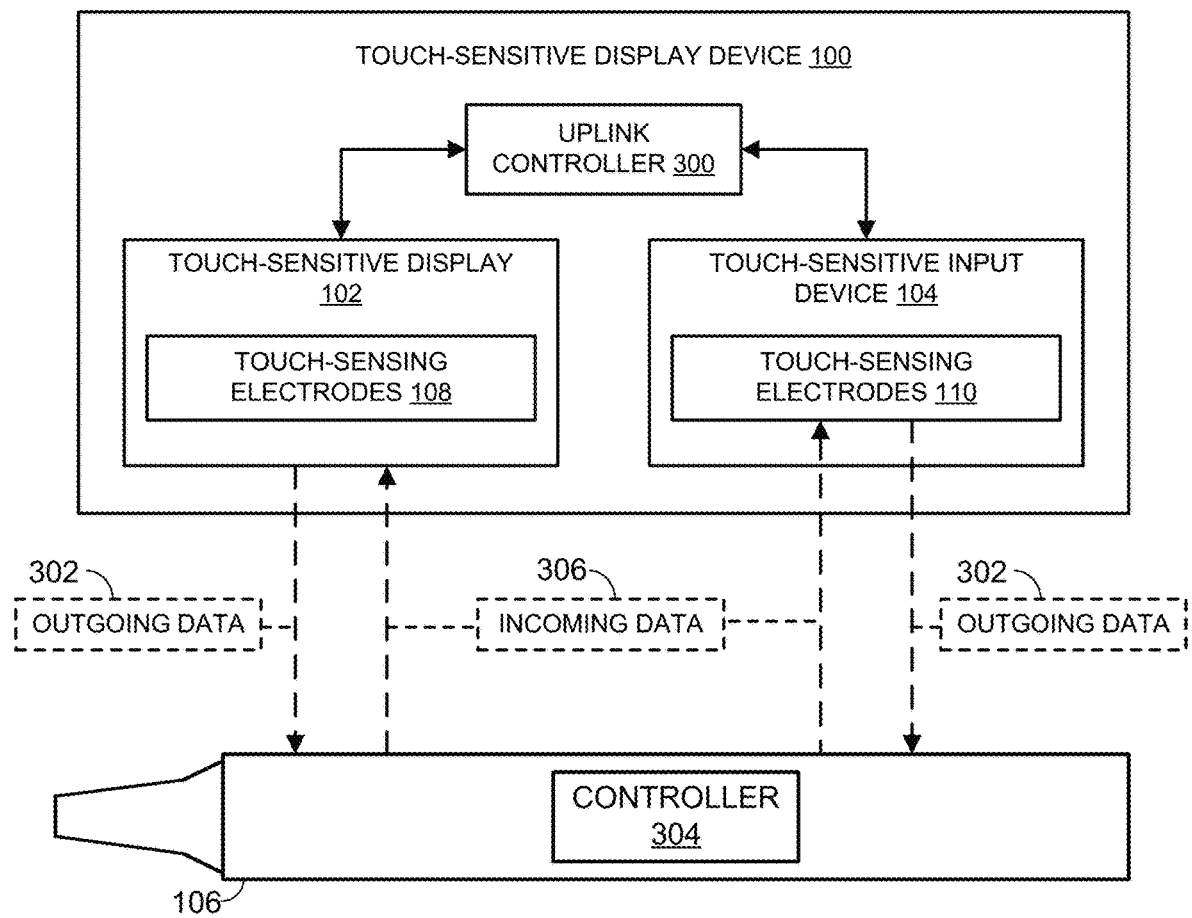
FIG. 3 schematically illustrates driving first and second pluralities of touch-sensing electrodes to transmit outgoing computer data.

This is schematically illustrated with respect to FIG. 3. Specifically, FIG. 3 shows another schematic representation of touch-sensitive display device 100, including touch-sensitive display 102 and touch-sensitive input device 104. As shown, touch-sensitive display 102 includes a first plurality of touch-sensing electrodes 108, while different touch-sensitive input device 104 includes a second plurality of touch-sensing electrodes 110. Touch-sensitive display device 100 also includes a peripheral device uplink controller 300, configured to coordinate and control exchange of data between the touch-sensitive display device and one or more separate peripheral devices, such as active stylus 106. As discussed above, the peripheral device uplink controller may be implemented via any suitable combination of one or more computer logic components, such as logic subsystem 502 described below with respect to FIG. 5.

The peripheral device uplink controller drives each of the first plurality of touch-sensing electrodes and the second plurality of touch-sensing electrodes with an encoded electrostatic drive signal. In other words, each individual touch-sensing electrodes is driven with an encoded electrical signal that affects electrical conditions in the local vicinity of the touch-sensing electrode. It will be understood that driving a "plurality" of touch-sensing electrodes need not include driving every touch-sensing electrode of a touch-sensitive display and or different touch-sensitive input device. Rather, in some cases, the first and/or second pluralities of touch-sensing electrodes may include fewer than all of the touch-sensing electrodes of the touch-sensitive display and/or touch-sensitive input device.

A change in electrical conditions caused by driving the first and/or second pluralities of touch-sensing electrodes may be detectable by other electronic devices in the vicinity of the touch-sensing electrodes. For instance, active stylus 106 may include one or more stylus electrodes that are sensitive to the changes in electrical conditions caused by the touch-sensitive display device driving touch-sensing electrodes with an encoded electrostatic drive signal. This beneficially enables the active stylus to receive and decode the information transmitted by the touch-sensitive display device, without relying on potentially slower RF wireless communication approaches. For instance, the active stylus (or other peripheral device) may then interpret the detected changes in electrical conditions to decode the outgoing computer data transmitted by the touch-sensitive display device. It will be understood that this description of electrostatic communication is deliberately simplified for the sake of explanation, and that touch-sensing electrodes may be used to transmit outgoing data to a separate peripheral device in any suitable way without departing from the scope of the present disclosure.

This is also schematically illustrated with respect to FIG. 3. As shown, peripheral device uplink controller 300 drives the first and second pluralities of touch-sensing electrodes to transmit outgoing computer data 302 toward active stylus 106. The active stylus includes a stylus controller 304, which may be configured to detect changes in local electrical conditions influenced by the electrostatic drive signal applied to touch-sensing electrodes 108 and 110. The stylus controller may then decode the outgoing computer data and respond in any suitable way—e.g., by providing haptic feedback in a manner specified by the touch-sensitive display device. It will be understood that stylus controller 304 may be implemented via any suitable combination of computer logic components. In some examples, stylus controller 304 may be implemented as logic subsystem 502 described below with respect to FIG. 5.

In some cases, both sets of touch-sensing electrodes may be driven concurrently. In other words, two or more different pluralities of touch-sensing electrodes corresponding to two or more different touch-sensitive input devices may simultaneously be driven with the same electrostatic drive signal for at least some length of time. Notably, this does not require that the two or more different pluralities of touch-sensing electrodes be driven with the encoded electrostatic drive signal starting at the same time, or ending at the same time—e.g., driving of the two or more different pluralities of electrodes may be concurrent even if the electrostatic drive signal is applied to one set of electrodes before another.

As discussed above, driving two or more different pluralities of touch-sensing electrodes with the same encoded electrostatic drive signal, corresponding to two or more different touch-sensitive input devices, may increase the effective area in which a peripheral device can detect the drive signal and thereby receive the encoded data. This is schematically illustrated with respect to FIG. 4, which shows a side profile of computing device 100. Touch-sensing electrodes corresponding to touch-sensitive display 102 and touch-sensitive input device 104 are being driven with an electrostatic drive signal, which is detectable in the local vicinity of touch-sensitive display device 100, and graphically represented in FIG. 4 by several dashed arrows 400 extending away from the touch-sensitive display device.

Figure 4:
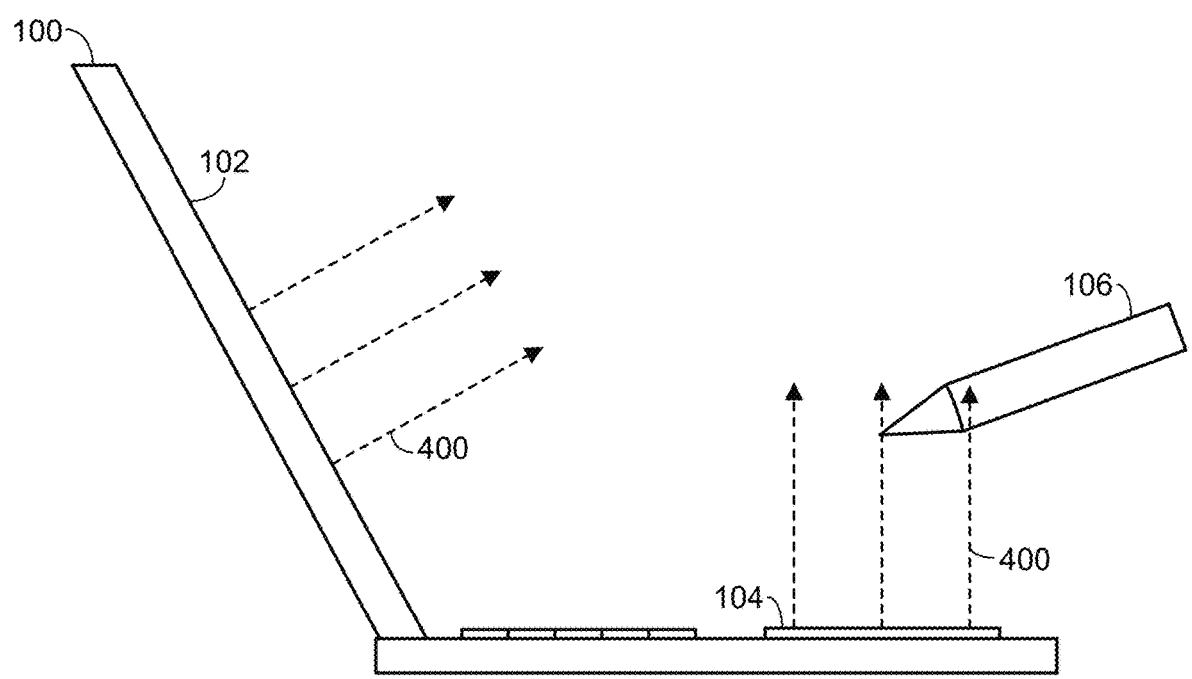
FIG. 4 schematically depicts electrostatic communication between an example touch-sensitive display device and peripheral device.

It will be understood that the angles and lengths used by the dashed arrows representing the encoded electrostatic drive signal in FIG. 4 are arbitrary and intended only for the sake of illustration. In practice, the encoded electrostatic drive signal may be detectable in a three-dimensional region of space in the vicinity of the touch-sensitive display device. The specific size and shape of the region in which the drive signal is detectable, and the strength of the signal at any particular distance relative to the touch-sensing electrodes, will vary depending on the implementation—e.g., the arrangement and capabilities of the touch-sensing electrodes driven with the encoded signal.

In FIG. 4, active stylus 106 is shown at a position near the touch-sensitive display device. For example, the active stylus may be held by a human user (not shown) who is bringing the stylus into proximity with the touch-sensitive display device with the intention of controlling the display device using the stylus. In the illustrated example, the active stylus is not yet near enough to the touch-sensitive display 102 to detect the electrostatic drive signal emitted by touch-sensing electrodes corresponding to the display panel. However, the stylus is near enough to touch-sensitive input device 104 to detect the electrostatic drive signal emitted by the second plurality of touch-sensing electrodes 110, corresponding to input device 104. Thus, the active stylus may receive outgoing computer data transmitted by the touch-sensitive display device more quickly than would be the case if only the touch-sensing electrodes of the display were driven with the electrostatic drive signal. This may enable faster pairing between the stylus and touch-sensitive display device, and/or enable faster and more efficient data communication between the two devices in general.

The present disclosure has thus far primarily focused on communication between a touch-sensitive display device and a single peripheral device—e.g., an active stylus. However, it will be understood that the techniques described herein may be applied in any scenario where a computing device electrostatically communicates with one or more separate peripheral devices. For example, a touch-sensitive display device may transmit outgoing data to two or more separate styluses at once—e.g., corresponding to different users who are interacting with the touch-sensitive display device at the same time.

Furthermore, the present disclosure has primarily focused only on communication between a touch-sensitive display device and separate peripheral device via driving of touch-sensing electrodes with an encoded electrostatic drive signal. It will be understood, however, that a computing device and peripheral device may communicate using any suitable number and variety of different communications channels in addition to, or instead of, electrostatic communication as described herein. For example, in FIG. 4, computing device 100 and active stylus 106 may additionally communicate over a suitable radio-frequency communications channel—e.g., via Bluetooth®, near-field communication, or Wi-Fi®.

Furthermore, the present disclosure has thus far focused primarily on transmission of outgoing data from a computing device to a separate peripheral device. Additionally, or alternatively, the computing device may receive incoming data transmitted by one or more separate peripheral devices. For instance, a touch-sensitive display device (e.g., device 100) that transmits outgoing data to a separate peripheral device (e.g., active stylus 106) may additionally receive an electrostatic downlink signal from the separate peripheral device, by detecting changes in electrical conditions at either or both of the first plurality of touch-sensing electrodes and the second plurality of touch-sensing electrodes.

This is also schematically illustrated with respect to FIG. 3. Specifically, as shown, touch-sensitive display device 100 receives a set of incoming data 306 from active stylus 106. In other words, the techniques described herein may beneficially enable a separate peripheral device (such as an active stylus) to transmit information to the touch-sensitive display device, and this information may be detected at either or both of the first and second touch-sensitive input devices, effectively increasing the range at which the information can be received by the touch-sensitive display device. For instance, stylus controller 304 may encode the set of incoming data as an electrostatic drive signal used to drive one or more stylus electrodes of the active stylus. This may be referred to as a "downlink" signal, as data is communicated from the peripheral device to the touch-sensitive display device. Changes in electrical conditions caused by the stylus's electrostatic downlink signal may be detected at either or both of touch-sensing electrodes 108 and touch-sensing electrodes 110. The touch-sensitive display device (e.g., peripheral device uplink controller 300) may then decode the electrostatic downlink signal as a set of incoming data (e.g., incoming data 306) from the separate peripheral device.

Notably, the electrostatic downlink signal may be detected at either or both of the first and second pluralities of touch-sensing electrodes. This may enable the touch-sensitive display device to detect incoming data from the peripheral device more quickly, and/or from a greater distance, than would be the case if only the touch-sensing electrodes corresponding to the display panel were used for detecting electrostatic downlink signals.

For instance, returning to FIG. 4, a human user is moving active stylus 106 toward touch-sensitive display device 100. As the touch-sensitive display device is emitting an uplink signal toward the active stylus, the active stylus may also transmit a downlink signal. The downlink signal may in some cases be detected at touch-sensitive input device 104 prior to being detected at touch-sensitive display 102, depending on the position and/or orientation of the stylus relative to the touch-sensitive display device. Regardless, data received from the stylus at the touch-sensitive input device may be used to control behavior of the touch-sensitive display device (e.g., to initiate pairing) before the downlink signal from the stylus is detected at the display panel itself. Thus, for instance, a laptop computer may apply a user's desired ink color and haptic feedback settings specified by a downlink signal emitted by the user's stylus and detected at the laptop's touch pad, and this may serve to reduce or eliminate any noticeable latency interval prior to the user's desired settings being applied.

Furthermore, the incoming data received at the touch-sensitive display device from the separate peripheral device may influence the outgoing data transmitted by the display device to the peripheral. For instance, the initial outgoing data transmitted by the touch-sensitive display device may be useable for establishing a pairing between the display device and a separate peripheral. After receiving incoming data from the peripheral device (e.g., a pairing acknowledgement), the touch-sensitive display device may dynamically change the outgoing data transmitted by the touch-sensing electrodes. In other words, the touch-sensitive display device may be further configured to, based at least in part on the set of incoming data from the separate peripheral device, change the encoded electrostatic signal used to drive the first plurality of touch-sensing electrodes and the second plurality of touch-sensing electrodes to transmit different outgoing computer data to the separate peripheral device. In other words, the touch-sensitive display device may beneficially respond to the information received from the separate peripheral device regardless of the touch-sensitive input device at which the information was received. In other words, the touch-sensitive display device may change the encoded electrostatic signal used to drive both pluralities of touch-sensing electrodes, regardless of the touch-sensing electrodes at which the incoming data was initially received. For instance, a touch-sensitive display may respond to proximity of an active stylus before any signals emitted by the stylus are detected at the display—e.g., because the stylus has already been detected at a touch pad.

As with the outgoing data transmitted by the touch-sensitive display device, the incoming data received from the separate peripheral device may take any suitable form. As one non-limiting example, the incoming data may include an identifier of the separate peripheral device—e.g., a unique device identifier useable for establishing a pairing between the peripheral device and the touch-sensitive display device. Additionally, or alternatively, the incoming data may specify preferences information for a user of the separate peripheral device (e.g., a user ID, haptic feedback preferences, ink color preferences), and/or the incoming data may specify timing information for coordinating future exchange of data between the touch-sensitive display device and the separate peripheral device (e.g., a frequency at which data will be transmitted). This may beneficially enable the touch-sensitive display device and the separate peripheral device to coordinate more efficient exchange of data going forward—e.g., in terms of synchronizing the timing frames and/or sub-frames at which different types of data are transmitted.

Furthermore, it will be understood that the incoming data received by the touch-sensitive display device may vary depending on the type of peripheral device in use. For example, when the separate peripheral device is an active stylus, the incoming data may specify one or both of a tilt angle and a twist angle of the active stylus. Additionally, or alternatively, the incoming data may specify a measured pressure between a tip of the active stylus and a surface of the touch-sensitive display. This may, for instance, beneficially enable the touch-sensitive display device to respond differently to proximity of the active stylus depending on the posture (e.g., tilt, twist) and/or pressure of the active stylus relative to the touch-sensitive display. As a non-limiting example, the size or color of graphical "ink" rendered by the touch-sensitive display device may change depending on the tilt, twist, and/or pressure of the active stylus.

The present disclosure has thus far focused on receiving incoming data from only a single separate peripheral device. It will be understood, however, that a touch-sensitive display device may exchange data with any suitable number of separate peripheral devices, individually or simultaneously. In other words, the touch-sensitive display device may, for example, receive a second electrostatic downlink signal from a second peripheral device by detecting changes in electrical conditions at either or both of the first plurality of touch-sensing electrodes and the second plurality of touch-sensing electrodes.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
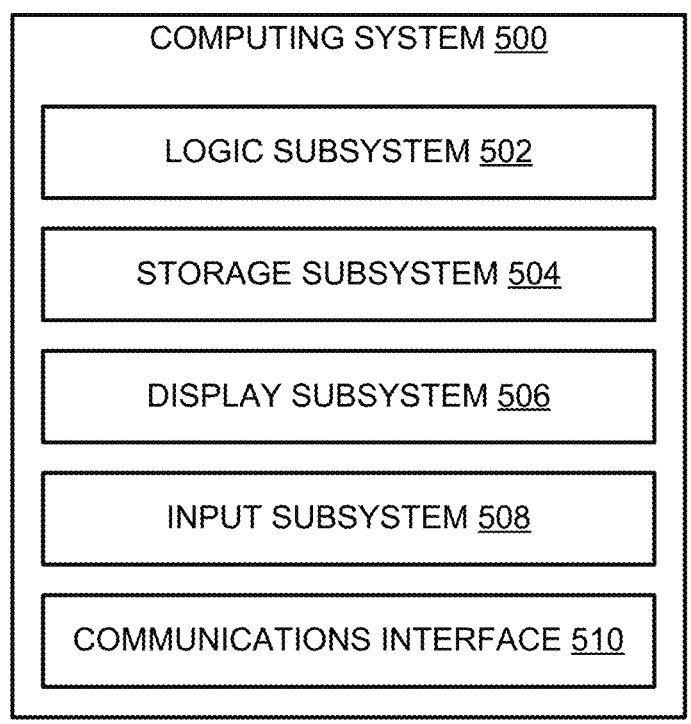
FIG. 5 schematically shows an example computing system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions.

Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICS), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 506 may be used to present a visual representation of data held by storage subsystem 504. This visual representation may take the form of a graphical user interface (GUI). Display subsystem 506 may include one or more display devices utilizing virtually any type of technology. In some implementations, display subsystem may include one or more virtual-, augmented-, or mixed reality displays.

When included, input subsystem 508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computing system 500 with one or more other computing devices. Communication subsystem 510 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a touch-sensitive display device comprises: a first touch-sensitive input device comprising a touch-sensitive display including a first plurality of touch-sensing electrodes; a second touch-sensitive input device including a second plurality of touch-sensing electrodes; and a peripheral device uplink controller configured to: receive a command to transmit outgoing computer data from the touch-sensitive display device to a separate peripheral device via an electrostatic uplink; transmit the outgoing computer data via the first plurality of touch-sensing electrodes of the touch-sensitive display by driving the first plurality of touch-sensing electrodes with an encoded electrostatic drive signal; and transmit the outgoing computer data via the second plurality of touch-sensing electrodes of the second touch-sensitive input device by driving the second plurality of touch-sensing electrodes with the encoded electrostatic drive signal. In this example or any other example, the peripheral device uplink controller is further configured to receive an electrostatic downlink signal from the separate peripheral device by detecting changes in electrical conditions at either or both of the first plurality of touch-sensing electrodes and the second plurality of touch-sensing electrodes. In this example or any other example, the touch-sensitive display device is configured to decode the electrostatic downlink signal as a set of incoming data from the separate peripheral device. In this example or any other example, the touch-sensitive display device is further configured to, based at least in part on the set of incoming data from the separate peripheral device, change the encoded electrostatic signal used to drive the first plurality of touch-sensing electrodes and the second plurality of touch-sensing electrodes to transmit different outgoing computer data to the separate peripheral device. In this example or any other example, the incoming data includes an identifier of the separate peripheral device. In this example or any other example, the separate peripheral device is an active stylus, and the incoming data specifies one or both of a tilt angle and a twist angle of the active stylus. In this example or any other example, the separate peripheral device is an active stylus, and the incoming data specifies a measured pressure between a tip of the active stylus and a surface of the touch-sensitive display. In this example or any other example, the incoming data specifies preferences information for a user of the separate peripheral device. In this example or any other example, the incoming data specifies timing information for coordinating future exchange of data between the touch-sensitive display device and the separate peripheral device. In this example or any other example, the peripheral device uplink controller is further configured to receive a second electrostatic downlink signal from a second peripheral device by detecting changes in electrical conditions at either or both of the first plurality of touch-sensing electrodes and the second plurality of touch-sensing electrodes. In this example or any other example, the first plurality of touch-sensing electrodes are driven with the encoded electrostatic drive signal concurrently with the second plurality of touch-sensing electrodes. In this example or any other example, the outgoing computer data transmitted to the separate peripheral device specifies an identifier of the touch-sensitive display device. In this example or any other example, the outgoing data transmitted to the separate peripheral device specifies haptic information useable for controlling haptic behavior of the separate peripheral device. In this example or any other example, the second touch-sensitive input device comprises a touch pad.

In an example, a method for electrostatic data communication comprises: at a peripheral device uplink controller of a touch sensitive display device, receiving a command to transmit outgoing computer data from the touch-sensitive display device to a separate peripheral device via an electrostatic uplink; at a first plurality of touch-sensitive electrodes corresponding to a first touch-sensitive input device comprising a touch-sensitive display of the touch-sensitive display device, transmitting the outgoing computer data by driving the first plurality of touch-sensing electrodes with an encoded electrostatic drive signal; and at a second plurality of touch-sensing electrodes corresponding to a second touch-sensitive input device of the touch-sensitive display device, transmitting the outgoing computer data by driving the second plurality of touch-sensing electrodes with the encoded electrostatic drive signal. In this example or any other example, the method further comprises receiving an electrostatic downlink signal from the separate peripheral device by detecting changes in electrical conditions at either or both of the first plurality of touch-sensing electrodes and the second plurality of touch-sensing electrodes. In this example or any other example, the method further comprises decoding the electrostatic downlink signal as a set of incoming data from the separate peripheral device, and based at least in part on the set of incoming data, changing the encoded electrostatic signal used to drive the first plurality of touch-sensing electrodes and the second plurality of touch-sensing electrodes to transmit different outgoing computer data to the separate peripheral device. In this example or any other example, the separate peripheral device is an active stylus, and the incoming data specifies one or both of a tilt angle and a twist angle of the active stylus. In this example or any other example, the outgoing data transmitted to the separate peripheral device specifies haptic information useable for controlling haptic behavior of the separate peripheral device.

In an example, a touch-sensitive display device comprises: a touch-sensitive display including a first plurality of touch-sensing electrodes; a touch pad including a second plurality of touch-sensing electrodes; and a stylus uplink controller configured to: receive a command to transmit outgoing computer data from the touch-sensitive display device to a separate active stylus via an electrostatic uplink; transmit the outgoing computer data via the first plurality of touch-sensing electrodes of the touch-sensitive display by driving the first plurality of touch-sensing electrodes with an encoded electrostatic drive signal; and concurrently transmit the outgoing computer data via the second plurality of touch-sensing electrodes of the touch pad by driving the second plurality of touch-sensing electrodes with the encoded electrostatic drive signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive display device, comprising:
   a first touch-sensitive input device comprising a touch-sensitive display including a first plurality of touch-sensing electrodes;
   a second touch-sensitive input device comprising a touch pad including a second plurality of touch-sensing electrodes, the touch pad lacking display pixels for presenting digital imagery; and
   a peripheral device uplink controller configured to:
      receive a command to transmit outgoing computer data from the touch-sensitive display device to a separate peripheral device via an electrostatic uplink;
      transmit the outgoing computer data via the first plurality of touch-sensing electrodes of the touch-sensitive display by driving the first plurality of touch-sensing electrodes with an encoded electrostatic drive signal; and
      concurrently transmit the outgoing computer data via the second plurality of touch-sensing electrodes of the touch pad by driving the second plurality of touch-sensing electrodes with the encoded electrostatic drive signal.

2. The touch-sensitive display device of claim 1, wherein the peripheral device uplink controller is further configured to receive an electrostatic downlink signal from the separate peripheral device by detecting changes in electrical conditions at either or both of the first plurality of touch-sensing electrodes and the second plurality of touch-sensing electrodes.

3. The touch-sensitive display device of claim 2, wherein the touch-sensitive display device is configured to decode the electrostatic downlink signal as a set of incoming data from the separate peripheral device.

4. The touch-sensitive display device of claim 3, wherein the touch-sensitive display device is further configured to, based at least in part on the set of incoming data from the separate peripheral device, change the encoded electrostatic signal used to drive the first plurality of touch-sensing electrodes and the second plurality of touch-sensing electrodes to transmit different outgoing computer data to the separate peripheral device.

5. The touch-sensitive display device of claim 3, wherein the incoming data includes an identifier of the separate peripheral device.

6. The touch-sensitive display device of claim 3, wherein the separate peripheral device is an active stylus, and the incoming data specifies one or both of a tilt angle and a twist angle of the active stylus.

7. The touch-sensitive display device of claim 3, wherein the separate peripheral device is an active stylus, and the incoming data specifies a measured pressure between a tip of the active stylus and a surface of the touch-sensitive display.

8. The touch-sensitive display device of claim 3, wherein the incoming data specifies preferences information for a user of the separate peripheral device.

9. The touch-sensitive display device of claim 3, wherein the incoming data specifies timing information for coordinating future exchange of data between the touch-sensitive display device and the separate peripheral device.

10. The touch-sensitive display device of claim 2, wherein the peripheral device uplink controller is further configured to receive a second electrostatic downlink signal from a second peripheral device by detecting changes in electrical conditions at either or both of the first plurality of touch-sensing electrodes and the second plurality of touch-sensing electrodes.

11. The touch-sensitive display device of claim 1, wherein the first plurality of touch-sensing electrodes are driven with the encoded electrostatic drive signal concurrently with the second plurality of touch-sensing electrodes.

12. The touch-sensitive display device of claim 1, wherein the outgoing computer data transmitted to the separate peripheral device specifies an identifier of the touch-sensitive display device.

13. The touch-sensitive display device of claim 1, wherein a surface of the touch-sensitive display is angled relative to a surface of the touch pad;
wherein the encoded electrostatic drive signal is detectable by the separate peripheral device in a region of space in a vicinity of the touch-sensitive display device;
wherein a size of the region of space is increased by concurrently driving the first plurality of touch-sensing electrodes of the touch-sensitive display and the second plurality of touch-sensing electrodes of the touch pad with the encoded electrostatic drive signal.

14. A method for electrostatic data communication, the method comprising:
at a peripheral device uplink controller of a touch-sensitive display device, receiving a command to transmit outgoing computer data from the touch-sensitive display device to a separate peripheral device via an electrostatic uplink;
at a first plurality of touch-sensitive electrodes corresponding to a first touch-sensitive input device comprising a touch-sensitive display of the touch-sensitive display device, transmitting the outgoing computer data by driving the first plurality of touch-sensing electrodes with an encoded electrostatic drive signal; and
at a second plurality of touch-sensing electrodes corresponding to a second touch-sensitive input device comprising a touch pad of the touch-sensitive display device, the touch pad lacking display pixels for presenting digital imagery, concurrently transmitting the outgoing computer data by driving the second plurality of touch-sensing electrodes with the encoded electrostatic drive signal.

15. The method of claim 14, further comprising receiving an electrostatic downlink signal from the separate peripheral device by detecting changes in electrical conditions at either or both of the first plurality of touch-sensing electrodes and the second plurality of touch-sensing electrodes.

16. The method of claim 15, further comprising decoding the electrostatic downlink signal as a set of incoming data from the separate peripheral device, and based at least in part on the set of incoming data, changing the encoded electrostatic signal used to drive the first plurality of touch-sensing electrodes and the second plurality of touch-sensing electrodes to transmit different outgoing computer data to the separate peripheral device.

17. The method of claim 16, wherein the separate peripheral device is an active stylus, and the incoming data specifies one or both of a tilt angle and a twist angle of the active stylus.

18. The method of claim 14, wherein a surface of the touch-sensitive display is angled relative to a surface of the touch pad;
wherein the encoded electrostatic drive signal is detectable by the separate peripheral device in a region of space in a vicinity of the touch-sensitive display device;
wherein a size of the region of space is increased by concurrently driving the first plurality of touch-sensing electrodes of the touch-sensitive display and the second plurality of touch-sensing electrodes of the touch pad with the encoded electrostatic drive signal.

19. A touch-sensitive display device, comprising:
a touch-sensitive display including a first plurality of touch-sensing electrodes;
a touch pad including a second plurality of touch-sensing electrodes, the touch pad lacking display pixels for presenting digital imagery; and
a stylus uplink controller configured to:
receive a command to transmit outgoing computer data from the touch-sensitive display device to a separate active stylus via an electrostatic uplink;
transmit the outgoing computer data via the first plurality of touch-sensing electrodes of the touch-sensitive display by driving the first plurality of touch-sensing electrodes with an encoded electrostatic drive signal;
concurrently transmit the outgoing computer data via the second plurality of touch-sensing electrodes of the touch pad by driving the second plurality of touch-sensing electrodes with the encoded electrostatic drive signal.

20. The touch-sensitive display device of claim 19, wherein a surface of the touch-sensitive display is angled relative to a surface of the touch pad;
wherein the encoded electrostatic drive signal is detectable by the separate active stylus in a region of space in a vicinity of the touch-sensitive display device;
wherein a size of the region of space is increased by concurrently driving the first plurality of touch-sensing electrodes of the touch-sensitive display and the second plurality of touch-sensing electrodes of the touch pad with the encoded electrostatic drive signal.

* * * * *